United States Patent

[11] 3,628,126

[72] Inventors Chuji Kawakami;
Ichiro Kouzuma; Yoshisada Sugai, all of Tokyo, Japan
[21] Appl. No. 881,518
[22] Filed Dec. 2, 1969
[45] Patented Dec. 14, 1971
[73] Assignee Kabushiki Kaisha Meidensha
Tokyo, Japan
[32] Priorities Dec. 6, 1968
[33] Japan
[31] 43/89448;
Dec. 6, 1968, Japan, No. 43/89449

[54] SUPPLEMENTARY CHARGE CIRCUIT FOR DC-TO-AC CONVERTER
1 Claim, 4 Drawing Figs.
[52] U.S. Cl. .................................................. 321/45 C,
321/45 R
[51] Int. Cl. .................................................. H02m 7/52
[50] Field of Search ........................................... 321/5, 45,
45 C; 318/227

[56] References Cited
UNITED STATES PATENTS
3,213,287 10/1965 King .............................. 321/45 C UX
3,354,370 11/1967 Corry et al. ...................... 318/227
3,474,320 10/1969 Chandler ......................... 321/45 X
3,500,170 3/1970 Charrin et al. ................... 321/45
3,504,264 3/1970 Suelzle ............................ 321/45 X
3,568,021 3/1971 Turnbull .......................... 321/45 C
3,543,131 11/1970 Johnston ......................... 321/5

Primary Examiner—William H. Beha, Jr.
Attorney—Kelman and Berman

ABSTRACT: An inverter circuit in which a constant voltage power source for effecting supplementary charging of commutation capacitors is provided separately from a variable voltage direct current power source so as to supply a supplementary charge voltage from said constant voltage power source to said commutation capacitors through supplementary charge thyristors at all times.

PRIOR ART

Patented Dec. 14, 1971

INVENTORS.
Chuji Kawakami, Ichiro Kouzuma,
Yoshisada Sugai

Kelman and Berman
AGENTS.

PRIOR ART Fig. 3
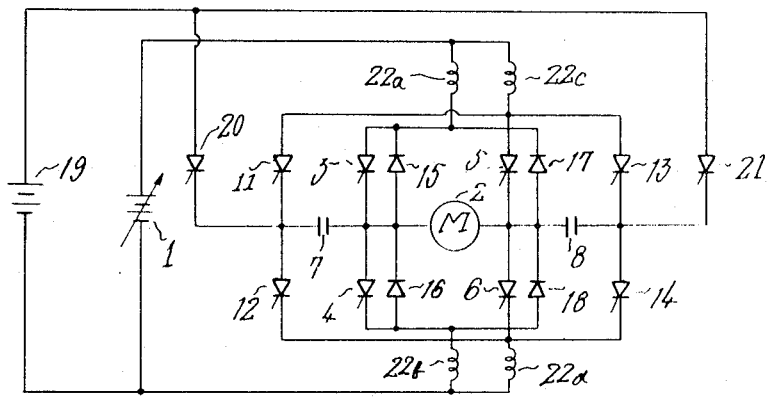
Fig. 4
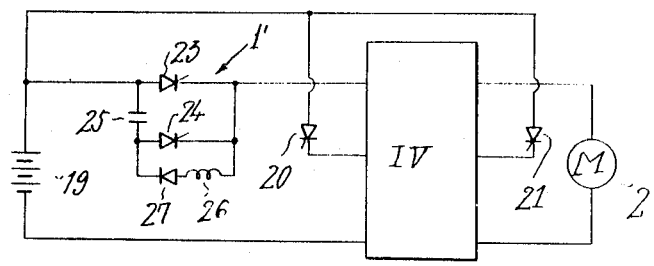
INVENTORS.
Chuji Kawakami, Ichiro Kouzuma,
Yoshisada Sugai
BY: Kelman and Berman
AGENTS.

3,628,126

SUPPLEMENTARY CHARGE CIRCUIT FOR DC-TO-AC CONVERTER

This invention relates to inverter circuits for converting an input direct current into an output alternating current and for supplying said alternating current to a load. More particularly, the invention is concerned with an inverter circuit which comprises at least two main thyristors for alternately passing oppositely directed direct currents to the load, at least one commutation capacitor for alternately actuating said main thyristors to thereby effect switching between said oppositely directed direct currents, at least one commutation reactor constituting a resonance circuit with said commutation capacitor, at least two auxiliary thyristors for applying the charges of said commutation capacitors to said main thyristors, and commutation diodes for aiding in the commutation operation.

In an inverter circuit of the type described known in the art, commutation capacitors are charged from a direct current power source by turning on main thyristors and auxiliary thyristors. Therefore, the charge voltages of the commutation capacitors are directly influenced by the voltage of the direct current power source, and hence the values of charge voltages of the commutation capacitors immediately before effecting commutation play an important role in causing the load of the inverter circuit to operate satisfactorily.

Therefore, when a variable voltage direct current power source is used as the direct current power source for varying the voltage of the power source so as to thereby vary the voltage of the alternating current output of the inverter circuit or the voltage applied to the load, the charge voltages of the commutation capacitors will be at a low level if the voltage of the direct current power source is low. In such a case, it may be impossible to effect commutation satisfactorily and accordingly the circuit may not be able to drive the load. When the load of the inverter circuit is an alternating current electric motor, the frequency and voltage of the current will have to be varied substantially in proportion to each other if it is desired to operate the motor by varying its rate of revolution. Accordingly, in cases where the frequency of current is low, the voltage of the direct current will also be at a low level and consequently the charge voltages of the commutation capacitors will also be at a low level, making it impossible to effect commutation satisfactorily and thereby operate the motor as desired.

Moreover, the commutation circuit consisting of at least one commutation capacitor and at least one commutation reactor connected in series with one another constitutes a resonance circuit. This arrangement permits an increase in the efficiency of the commutation operation performed by the commutation capacitors by utilizing the resonance circuit to recharge the commutation capacitors with excess commutation energy. In such a circuit however, the rate of voltage rise $dV/dT$ is very high during the transient period of extinction because there is no impedance between the direct current power source and each of the thyristors of the inverter circuit. Therefore, such systems will not operate satisfactorily when ordinary thyristors are used.

The present invention obviates the aforementioned disadvantages of the prior art inverter circuit. According to the invention, a supplementary charge power source is provided in the inverter circuit separately from the direct current power source of said circuit for maintaining the commutation capacitors in a charged state at all times so as to prevent the lowering of the charge voltages of the commutation capacitors when the voltage of the input direct current is lowered, whereby the commutation operation can be carried out smoothly. The invention also contemplates the insertion of an impedance between the direct current power source and each of the thyristors of the inverter circuit for lowering the rate of voltage rise during the transition period of extinction and thereby preventing damage to the thyristors.

Accordingly, an object of this invention is to provide an inverter circuit including means for preventing the lowering of charge voltages of the commutation capacitors so as to permit satisfactory commutation at all times.

Another object of the invention is to provide an inverter circuit in which the rate of voltage rise across the thyristors is lowered during the transition period of extinction to prevent a sudden rise in the voltage applied thereacross and resultant damage thereto and which in addition prevents a sudden rise in voltage caused by a short-circuited current when commutation is not effected satisfactorily.

Additional objects as well as features and advantages of the invention will become apparent from consideration of the description set forth hereinafter when considered in conjunction with the accompanying drawings, in which:

FIG. 3 is a schematic diagram of a second embodiment of the inverter circuit according to this invention; and FIG. 4 is a schematic diagram of a third embodiment of the inverter circuit according to this invention.

Figure 1:
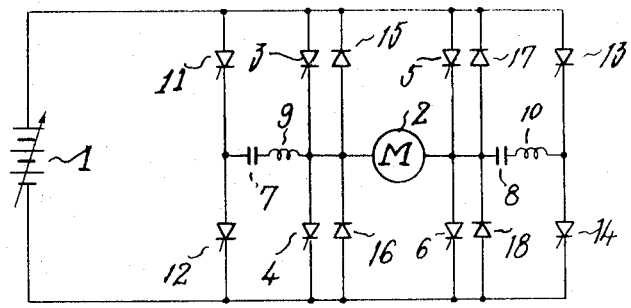
FIG. 1 is a schematic diagram showing one example of conventional inverter circuits.

Before describing the preferred embodiments of this invention with reference to the accompanying drawings, one example of conventional inverter circuits will be explained with reference to FIG. 1 to enable the objects, construction, and operation of this invention as well as the results achieved thereby to be clearly understood. The inverter circuit shown in FIG. 1 comprises main thyristors 3 to 6 for alternately passing oppositely directed direct currents from a variable voltage direct current power source 1 to a load 2 which is an alternating current electric motor, commutation capacitors 7 and 8 for causing said main thyristors to effect switching between said oppositely directed direct currents, commutation reactors 9 and 10 constituting a resonance circuit with said commutation capacitors, auxiliary thyristors 11 and 14 for applying the charges of said commutation capacitors to said main thyristors, and commutation diodes 15 to 18 for aiding in the commutation operation. The operation of the inverter circuit is substantially as follows:

Let us assume that the main thyristors 3 and 6 are fired so that a current is being passed from the power source 1 to the load 2 alternating current motor through the main thyristor 3, motor 2, and main thyristor 6. In order to fire the main thyristors 5 and 4 so as to cause the current to pass therethrough in place of the main thyristors 3 and 6, the auxiliary thyristors 12 and 13 are turned on by a gate control circuit (not shown) to charge the commutation capacitor 7 with a voltage supplied from the power source 1 through the main thyristor 3, commutation reactor 9, commutation capacitor 7 and auxiliary thyristor 12 so that the reactor 9 side may become positive and the cathode side of the auxiliary thyristor 11 may become negative and also to charge the commutation capacitor 8 with a voltage supplied from the power source 1 through the auxiliary thyristor 13, commutation reactor 10, commutation capacitor 8 and main thyristor 6 so that the reactor 10 side may become positive and the cathode side of main thyristor 5 may become negative. Then the gate signal of the main thyristors 3 and 6 is reduced to zero and the auxiliary thyristors 11 and 14 are turned on by the gate control circuit so as to cause the commutation capacitor 7 to release its charge through the commutation reactor 9, commutation diode 15 and auxiliary thyristor 11 and to cause the commutation capacitor 8 to release its charge through the commutation reactor 10, auxiliary thyristor 14 and commutation diode 18. As soon as they are discharged each of the commutation capacitors 7 and 8 is charged in such a manner that the respective reactor 9, 10 sides of the capacitors become negative. When this is the case, the resonance of the commutation capacitors 7, 8 and commutation reactors 9, 10 determines the maximum value and frequency of the current, so that the main thyristors 11 and 14 are also inversely biased and turned off by the transient voltage produced by the resonance while the current is passed to the commutation diodes 15 and 18. At the same time, the auxiliary thyristors 11 and 14 are also inversely biased and turned off by the transient voltage produced by the resonance, and the main thyristors 4 and 5 are inversely biassed and turned off through the auxiliary thyristors 12 and 14 while the commutation capacitors 7 and 8 are charged inversely (charged in such a manner that the reactor sides are made negative). Thereafter, if the main thyristors 4 and 5 are turned on, a current reversed in direction from the current passed previously is passed from the power source 1 to the alternating current motor 2 through the main thyristor 5, motor 2 and main thyristor 4, thereby completing a commutation cycle.

By reversing the process described hereinabove, it is possible to fire the main thyristors 3 and 6 so as to cause a current to pass therethrough in place of the main thyristors 4 and 5. Since no current is passed to the motor 2 when the main thyristors 3 and 5 or 4 and 6 are simultaneously turned on, it is possible to vary the power supplied to the load by varying this period. To attain the end, this time interval during which the main thyristors 3 and 6 are fired may be varied.

It will be seen from the foregoing description that if the voltage of the power source 1 is lowered, the charge voltages of the commutation capacitors will also be lowered, with the result that the commutation operation may fail and the load may be rendered inoperative. Also, the voltage rise in the transition period of extinction in such a circuit is very high so that the transient voltage which is produced by the resonance of the commutation capacitors and commutation reactors for extinguishing the thyristors is at a very high level. Thus, the thyristors may be damaged by such high voltage.

The present invention obviates the aforementioned problems. Preferred embodiments of the invention will now be explained with reference to FIGS. 2, 3 and 4.

Figure 2:
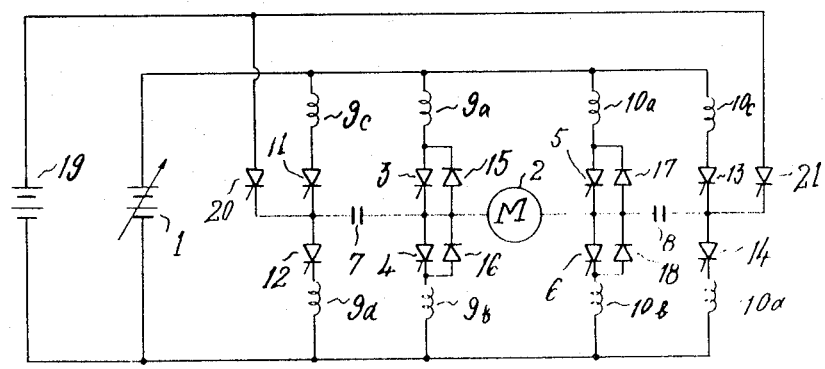
FIG. 2 is a schematic diagram of a first embodiment of the inverter circuit according to this invention.

In the embodiment of FIG. 2, the invention provides, in an inverter circuit comprising main thyristors 3 and 6 for alternately passing oppositely directed direct currents from a variable voltage direct current power source 1 to a load 2, commutation capacitors 7 and 8 for alternately actuating said main thyristors to thereby effect switching between said oppositely directed direct currents, commutation reactors 9J. −9d and 10a–10d each constituting a resonant circuit with one of said commutation capacitors, auxiliary thyristors 11 to 14 for applying the charges of said commutation capacitors to said main thyristors, and commutation diodes for aiding in the commutation operation, a constant voltage power source 19 for supplying power for effecting supplementary charging of the commutation capacitors and supplementary charge thyristors 20 and 21. Said constant voltage power source 19 is connected to said variable voltage direct current power source 1 through a negative terminal thereof which is also the negative terminal of said variable voltage power source 1, and said supplementary charge thyristors 20 and 21 which are connected to the positive terminal of said constant voltage power source 19. A supplementary charge voltage is supplied to the commutation capacitors 7 and 8 from said constant voltage power source 19 through said supplementary charge thyristors 20 and 21. At the same time, the commutation reactors 9a to 9d and 10a to 10d are inserted in the arms of main thyristors 3 and 6 and auxiliary thyristors 11 to 14 that is to say between the positive or negative terminal of the variable voltage direct current power source 1 and each of the thyristors.

The inverter circuit constructed as aforementioned operates as follows: When supplying oppositely directed direct currents to the load 2, the circuit of FIG. 2 operates in substantially the same manner as the conventional inverter circuit of FIG. ?, so that a detailed description is omitted. The description will be confined to the operation of the circuit which ensures that the commutation operation is positively carried out and the load is positively operated even when the voltage of the variable voltage direct current power source 1 is reduced, and to the operation of the circuit which prevents damage to the thyristors by precluding the rise of transient voltages during the transient period of extinction.

If the voltage of the variable voltage direct current power source 1 is lowered below the voltage of the constant voltage power source 19, the supplementary charge thyristors 20 and 21 will be turned on and fired by a gate control circuit (not shown) while the main thyristors 4 and 6 say remain fired. This causes the commutation capacitors 7 and 8 to be charged with a voltage from the constant voltage power source 19 through the supplementary charge thyristors 20 and 21 respectively so that their charge voltages are supplemented. In such a case, supplementary charging of the commutation capacitors 7 and 8 is carried out in such a manner that the cathode side of supplementary charging thyristors 20 and 21 is made positive and the anode side of main thyristors 4 and 6 is made negative. Luckily, however, the inverter circuit of the type described is adapted to perform commutation by the resonance of each of the capacitors and reactors, and if the Q of this resonant circuit is high, excess commutation energy can be reutilized for the next commutation operation. Thus, the charge voltages of commutation capacitors 7 and 8 when no supplementary charging is carried out (that is, the voltages of the commutation capacitors which are charged in such a manner that the anode side of main thyristors 4 and 6 is made positive and the cathode side of supplementary charging thyristors 20 and 21 is made negative) show no great differences as compared with the charge voltages of the commutation capacitors 7 and 8 when supplementary charging is carried out.

Since the commutation reactors are divided and inserted between the thyristors and power source, a sudden rise of the voltage applied to the thyristors during the transition period can be precluded so that the voltage rise rate $dV/dT$ of the transient voltage can be kept in a low level. Also, the value of the short-circuit current to the thyristors when the commutation operation is not carried out satisfactorily can be kept at low level.

As will be clearly understood from the foregoing description, this invention provides in one aspect an inverter circuit which is characterized by a constant voltage power source separate from the variable voltage direct current power source 1 for effecting supplementary charging of the commutation capacitors so as to supplement the charge voltages of the commutation capacitors through supplementary charge thyristors at all times, and at least one commutation reactor which is divided and serially inserted in the thyristor circuits, said commutation reactors constituting resonant circuits with one of the commutation capacitors. It will readily be understood that the inverter circuit constructed as described above offers many advantages, some of which are summarized as follows First of all, the charge voltages of the commutation capacitors can be maintained at a predetermined level when the input direct current voltage of the inverter circuit is lowered and the output alternating current voltage correspondingly lowered. Therefore, the commutation operation can be performed satisfactorily regardless of the fall of output voltage of the circuit. Thus the load can be driven as desired.

A second advantage lies in the fact that damage to the thyristors can be prevented because it is possible to preclude a sudden rise in the voltage applied to the thyristors during the transition period.

A third advantage is that when the commutation operation is not carried out satisfactorily, excess current caused by the short circuit which results can be prevented, so that the elements of the circuit are protected, A fourth advantage is that commutation is effected instantaneously by the resonant circuit of capacitors and reactors and no load current is required to effect commutation, so that a rectangular output current is provided.

Last but not the least important is the advantage that the inverter circuit of the construction described can operate efficiently because excess commutation energy can be reutilized.

Let us now turn to FIG. 3 showing a second embodiment of this invention which differs from the first embodiment shown in FIG. 2 in that the commutation reactors 9a and 10a inserted in the arms of main thyristors 3 and 5 respectively are combined into common commutation reactor 22a, the commutation reactors 9b and 10b inserted in the arms of main thyristors 4 and 6 are combined into a common commutation reactor 22b, the commutation reactors 9c and 10c inserted in the arms of auxiliary thyristors 11 and 13 respectively are combined into a common commutation reactor 22c, and the commutation reactors 9d and 10d inserted in the arms of auxiliary thyristors 12 and 14 respectively are combined into a common commutation reactor 22d.

More specifically, the main thyristors 3 and 6 and auxiliary thyristors 11 to 14 are divided into two groups, with the commutation reactors being inserted in the arms of the thyristors disposed on the same side of each group and used commonly by the respective thyristors. The commutation reactors 22a to 22d correspond to the commutation reactors 9 and 10 and each form a resonance circuit with one of the commutation capacitors 7 and 8.

In operation, the embodiment of FIG. 3 operates in the same manner as the embodiment of FIG. 2 in that when the voltage of the variable voltage direct current power source 1 is lowered below the voltage of the constant voltage power source 19 the charge voltages of commutation capacitors 7 and 8 are supplemented by a supply of voltage from the constant voltage power source 19 and the charge voltages of commutation capacitors 7 and 8, when no supplementary charging is carried out, are not greatly different from the charge voltages thereof when supplementary charging is carried out. The commutation reactors are arranged as if they were divided and inserted between the thyristors and power source, so that a rise in the voltage applied to the thyristors during the transition period is precluded and rise in the value of short circuited current when the commutation operation fails is also precluded.

As will be clearly understood from the foregoing description, this invention provides in another aspect an inverter circuit which is characterized by a constant voltage power source 19 separate from the variable voltage direct current power source 1 to effect a supplementary charging of the commutation capacitors so as to supplement the charge voltages of commutation capacitors through supplementary (charge) thyristors at all times, and commutation reactors 22a to 22d inserted in the arms of the thyristors used commonly by respective thyristors disposed on the same side of each of the two groups of main and auxiliary thyristors, said commutation reactors each forming a resonant circuit with one of the commutation capacitors. The embodiment of FIG. 3 offers an additional advantage as follows besides the five advantages set forth with respect to the embodiment of FIG. 2:

The additional advantage lies in the fact that, since the arms of the main thyristors and auxiliary thyristors disposed on the same side of each group are used commonly by respective thyristors and the commutation reactors are divided and inserted in said arms, the number of commutation reactors can be reduced below that of the embodiment of FIG. 2 even if the number of phases is increased.

FIG. 4 shows a third embodiment of this invention in which a variable voltage DC-to-DC converter, such as a chopper circuit 1' shown in the figure, for example, is used as the variable voltage direct current power source 1 so that a direct current voltage from the constant voltage power source 19 may be applied to the input of an inverter IV by varying said voltage by turning on and off a main thyristor 23 for the chopper circuit. The chopper circuit operates as follows:

If an auxiliary thyristor 24 for the chopper circuit is turned on by a gate control circuit (not shown), a commutation capacitor 25 will be charged with a voltage from the constant voltage power source 19 through the commutation capacitor 25 and auxiliary thyristor 24 in such a manner that the anode side of main thyristor 23 becomes positive. Then, if the main thyristor 23 is ignited by the gate control circuit, a direct current will be passed from the power source 19 through the main thyristor 23 to the inverter IV which is a load. At the same time, the charge of commutation capacitor 25 is released through commutation reactor 26 and commutation diode 27. As soon as discharged, the commutation capacitor 25 is recharged in such a manner that the anode side of auxiliary thyristor 24 for the chopper circuit may become positive. The charge voltage of commutation capacitor 25 in recharge is higher than that of the previous charge. During the charging period, the auxiliary thyristor 24 is inversely biassed by a transient voltage produced in the commutation reactor 26 and turned off. Thereafter, if the auxiliary thyristor 24 is turned on by the gate control circuit, the charge of commutation capacitor 25 will be released through the auxiliary thyristor 24, so that the main thyristor 23 is inversely biassed and turned off by the discharge of commutation capacitor 25. Then, the commutation capacitor 25 is charged with a voltage from the power source 19 through the commutation capacitor 25 and auxiliary thyristor 24 in such a manner that the anode side of main thyristor 23 becomes positive. This cycle of operations is repeated.

It will be evident that by using a chopper circuit which permits the supply of direct current of any desired value to the inverter IV by turning on and off a main thyristor in a controlled manner, it is possible to cause the inverter circuit to operate in the same manner as the inverter circuit of FIG. 2 or FIG. 3. It will also be evident that the embodiment of FIG. 4 can achieve the same results as the embodiment of FIG. 2 or FIG. 3. An additional advantage of the embodiment of FIG. 4 is that the input voltage of the variable voltage DC-to-DC converter can be used concurrently as the constant voltage power source 19 for effecting supplementary charging of the commutation capacitor.

It is to be understood that this invention is applicable to not only the bridge-type inverter circuits shown and described as embodiments but also a single phase inverter circuit, and inverter circuit using a transformer with a center tap and the like with slight alterations. The invention is intended to cover all such devices in its technical scope.

What is claimed is:

1. A DC-to-DC converter for converting the potential from external, variable-voltage DC source into an AC potential, the amplitude of said AC potential varying proportionally to the amplitude of said DC source and including circuitry to maintain satisfactory commutation when the potential of said DC source falls below the level at which satisfactory commutation is normally obtained, which comprises:
   at least two main semiconductor devices for alternately passing oppositely directed direct currents from an external, variable-voltage DC source to a load;
   circuitry for supplying potential from an external, fixed, supplemental DC voltage source, said variable voltage source and said fixed voltage source having one, similarly poled terminal connected in common;
   at least one commutation capacitor for alternately conditioning said at least two main semiconductor devices to effect switching of said oppositely directed direct current therebetween;
   at least two auxiliary semiconductor devices for applying the charge developed across said at least one commutation capacitor to said at least two main semiconductor devices, each of said at least two auxiliary semiconductor devices being similarly poled to, and connected across, a corresponding one of said at least two main semiconductor devices and across said variable-voltage DC source, said at least one commutation capacitor being connected between similar electrodes of at least one pair of main and auxiliary semiconductor devices;
   a commutation inductor divided into at least four sections, one section being serially inserted with said at least two main and said at least two auxiliary semiconductor devices, said commutation inductor forming a resonant circuit with said commutation capacitor;
   at least two commutation diodes connected directly across, and oppositely poled to, said at least two main semiconductor devices to aid the switching thereof; and at least one supplementary semiconductor device interconnecting the other, noncommon connected terminal of said fixed supplemental DC voltage source to the juncture of said at least one commutation capacitor and one of said at least two auxiliary semiconductor devices to supplementary charging current for said at least one commutation capacitor only when the voltage of said variable-voltage DC source is lowered, to lower the amplitude of said AC potential, below the voltage at which satisfactory commutation would otherwise be obtained.

* * * * *